Jan. 1, 1963 A. GABOR 3,071,723

DEVICE FOR DETECTING DEFECTS IN MAGNETIC TAPE

Filed May 3, 1960 2 Sheets-Sheet 1

INVENTOR.
ANDREW GABOR
BY Alfred W. Barber
ATTORNEY

*INVENTOR.*
ANDREW GABOR
BY Alfred W. Barber
ATTORNEY

United States Patent Office 3,071,723

Patented Jan. 1, 1963

3,071,723

DEVICE FOR DETECTING DEFECTS IN MAGNETIC TAPE

Andrew Gabor, Port Washington, N.Y., assignor to Potter Instrument Co. Inc., Plainview, N.Y., a corporation of New York Filed May 3, 1960, Ser. No. 26,537
3 Claims. (Cl. 324—34)

The present invention concerns magnetic tape recording and, in particular, methods of and means for testing magnetic tape for imperfections.

Conventional digital magnetic tape recording systems record the several bits which make up one character in the BCD or other codes, together with parity checking bits, one or more timing bits, and an auxiliary control bits, in parallel, simultaneously, across the width of the tape. This technique is employed by virtue of the convention of recording and playing back parallel bit information a character at a time. Parallel recording also provides increased data transfer rates as compared with serial recording methods since the entire character is transmitted at one instant. The principal limitation of the recording systems as described above arises from the fact that while the information may be recorded with perfect time synchronism between the various bits making up a given character, on playback a variety of factors enter to introduce interchannel time displacement so that the returned bits do not appear simultaneously, but rather distributed in time. The bits belonging to a given character are identified as belonging to that character by virtue of their proximity in the time domain. Typically, under ordinary circumstances such as the recording of 200 bits per inch, one finds that the jitter between playback pulses of a given character is not larger than a few percent of the character repetition time, thereby permitting the detection circuitry to make an unambiguous assignment of character for each bit. It is desirable, however, to increase the data transfer rates in recording systems to the utmost possible limits. For example, a recording system operating at five hundred fifty-five bits per inch consisting of seven channels recorded in parallel on one-half inch wide tape has been announced. If one attempted to record and playback information at this packing density on a conventional system designed for 200 bits per inch operation, where the channel time displacement would be so high that serious errors would result.

Some of the steps which are taken to obtain satisfactory operation in higher packing densities include very careful attention to the design and tolerances of the mechanical components in the tape guide and drive systems, exceptional care in the construction and alignment of the record playback head, and even the provision of independent delay lines in each head channel to compensate the residual scatter after these precautions have been observed. Another important source of error in recording systems is the appearance of defects in the magnetic recording media, which defects frequently take the form of nodular deposits left on the tape surface during the process of manufacture, and occasionally the form of small areas where gross blemishes or absence of recording material occur. While it is possible to eliminate the dropouts caused by the presence of nodules, by removing the nodule, no one has as yet discovered a technique for removing the effects of blemishes or absence of coating. However, it is necessary to locate the defective areas before any action can be taken. The present invention concerns methods of and means for pretesting tapes before usage in computers in order to locate the defective areas on the tape. The most significant test which can be used to distinguish satisfactory tape from defective tapes is to record information on the tapes in the same format employed in the computer with which the tapes are to be used. Thus, in general, one may conclude that tape transport, playback head, and amplifier equipment of the testing apparatus should be identical to that of the computer. The present invention, however, makes it possible to test tapes with the same recorded format information as used in the computer but with tape transport equipment which may exhibit much greater interchannel time displacement than would be permitted by the computer application.

The tape tester according to the present invention operates on the principle of recording flex transisitions on the tape at every possible position where they might occur in the computer operation for each channel and for all channels. Thus, for compatability with the 555 bit per inch, modified non-return to zero recording system, I record 555 flex transitions per inch of tape length in each channel. The bits in adjacent channels need not be related to one another in any particular time relationship. The tester according to the present invention examines each track independently, although simultaneously, the playback signal amplitude decreased to some critical threshold level. In each channel the test consists in triggering a timing circuit with each detected flex reversal, and using the timeout point of the timing circuit, to operate a gating circuit which examines the output of the amplifier for the presence of the succeeding pulse. If at the appropriate time, 1/555V of a second after the detection of one pulse the second pulse does not occur, then a dropout is indicated, indicating the presence of a tape defect. In the formula above, 555 represents the bit packing density in bits per inch from the example chosen and V represents the tape speed during the test period. This method of examination of the tape for the presence of a next pulse following each pulse in each channel permits the test to proceed completely independently of interchannel displacement time which could be large enough to prevent the use of this same equipment for reading parallel bit information. Since the information in the various channels is independently recorded and examined no precise equipment or circuitry is required resulting in a simple and economical testing system.

Accordingly, one object of the present invention is to provide a method of and means for testing magnetic recording tape intended for digital recording.

Another object is to examine such tape for defects which would cause dropouts during actual recording.

Still another object of the present invention is to provide dropout testing means the operation of which is unaffected by interchannel time displacement of the tape transport and reading means.

A further object of the present invention is to provide dropout testing apparatus which can test accurately at higher packing densities than the tape transport which is used in the test is capable of performing under normal circumstances of random information recording.

A further object of the present invention is to provide high density dropout testing apparatus which is simple and inexpensive.

These and other objects of the present invention will be clearly understood from the detailed description of the invention given in conjunction with the various figures of the drawing.

Figure 1:
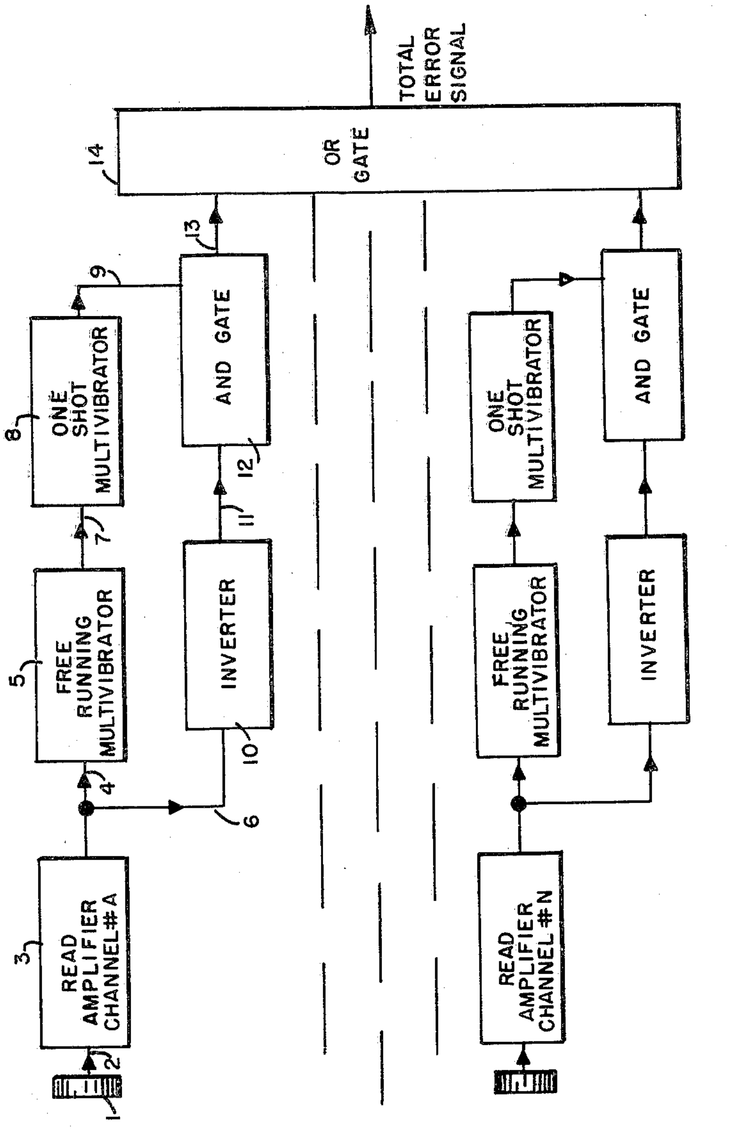
FIGURE 1 shows a block diagram of a preferred form of the present invention for testing digital magnetic recording tape.
Figure 2:
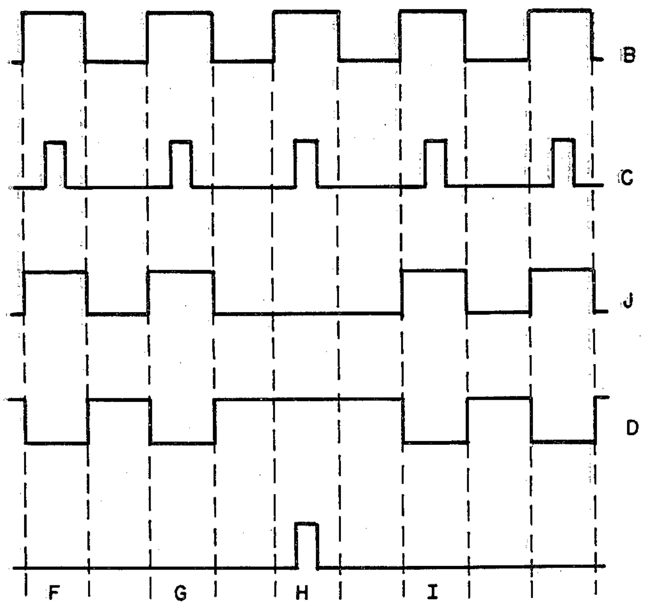
FIGURE 2 shows various wave forms useful in explaining the operation of the present invention according to the showing of FIGURE 1.

In FIGURE 1, a recording playback head for channel A is shown at 1 which picks up signals recorded on the tape being examined. It is assumed in order to carry out the testing of the magnetic tape that a squared wave form continuously recorded has been provided on the tape having a period equal to the period of signals which would actually be recorded in using the tape at a later date. For example, if the tape is to be used for pulse densities at 555 bits per inch a square wave having 555 reversals per inch are recorded in each channel on the tape. Signals picked up from playback head 1 are connected over line 2 to a reading amplifier 3 which contains conventional signal reconstructing circuits and provides an output over line 4. The signals thus picked up and reconstructed appear as shown in curve J of FIGURE 2. These reconstructed signals are applied to a free-running multivibrator 5 which is adjusted to synchronize on the leading edge of signals shown in J and will produce an output as shown in B of FIGURE 2. This output is applied over line 7 to a one-shot multivibrator 8 which has a slight delay and may be synchronized by the leading edge of its input pulses as shown in B. The output of the one-shot multivibrator on line 9 will have the form shown at C in FIGURE 2. The output of read amplifier 3 is also applied to the line 6 to an inverter 10 which provides the inverter signal as shown in D of FIGURE 2. The output of this inverter is applied to an "AND" gate 12 over line 11. The output of the one-shot multivibrator 8 is also applied over line 9 to "AND" gate 12. The "AND" gate may be defined in conventional terms as a device which produces no output for all conditions except the condition where all inputs represent 1. Since the "AND" gate receives signals as shown as C and D of FIGURE 2 it will be seen from FIGURE 2 that signals occurring in cells F, G and I of lines C and D representing the input for the end gate will provide no output since at each time when their one is represented by curve C a zero is represented by a curve D. However, in cell H an output will be provided, since the signal in line C being one and the signal in line D being one a coincidence is provided in the "AND" gate providing an output. The representative in cell H of line D represents an absence of signal from the tape indicating a dropout or defect in the tape.

If the above combination of pickup head reading amplifier free running multivibrator, one shot multivibrator, inverter, and "AND" gate are provided all feeding in to a common "OR" circuit 14, the output of this "OR" circuit over line 15 will be the sum of all dropout defects in all channels recorded on the digital magnetic recording tape.

Figure 3:
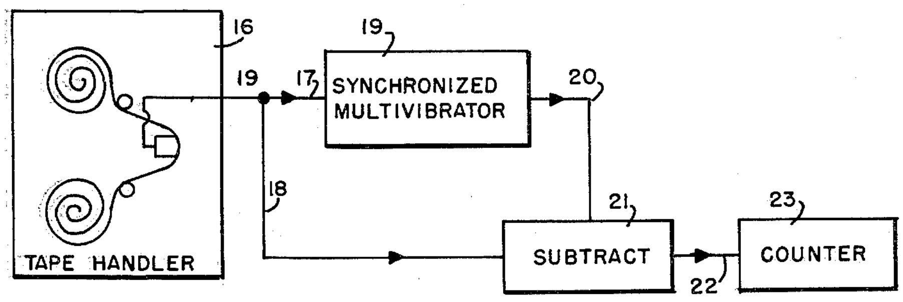
FIGURE 3 shows a simplified form of the present invention.

FIGURE 3 shows an even simpler dropout tester for digital recording magnetic tape. The output of the tape handler 16 is fed over line 17 to a free running multivibrator 19 which is synchronized by the signals from the tape handler and over line 18 to a subtraction circuit 21. The output of the multivibrator is also applied to the subtraction circuit 21 over line 20. Whenever a pulse is missed through a defect in the tape handler a pulse would be present in the output of the multivibrator but absent in the output from the tape handler causing pulse to be transmitted over line 22 to count at 23. Past count 23 will show the total number of defects causing dropouts in the magnetic tape for any given period of time.

While only a single embodiment of the present invention has been shown and described, many modifications will be apparent to those skilled in the art within the sphere and scope of the invention as set forth in particular in the appended claims.

What is claimed is:

1. In a system for testing magnetic tape for defects, the combination of, means for deriving signals from a magnetic tape upon which have been recorded continuing signals of substantially constant repetition rate, a free running multivibrator coupled to said signal deriving means and synchronized by said derived signals, means for comparing signals generated by said multivibrator with said derived signals to determine any presence of said multivibrator signals in the absence of said derived signals for indicating a defect in said magnetic tape and means for counting the occurrences of said excess to provide a measure of the defects in said magnetic tape.

2. In a system for testing magnetic tape for defects, the combination of, means for deriving signals from a magnetic tape to be tested upon which have been recorded continuing signals of substantially constant repetition rate, a free running multivibrator coupled to said signal deriving means and synchronized by said derived signals, an inverter for inverting the phase of said derived signals, an one-shot multivibrator controlled by said free running multivibrator, and AND gate for determining the absence of a signal from said inverter in the presence of a signal from said one-shot multivibrator to provide an output pulse indicating a defect in said tape and a counter for counting said output pulses to indicate the number of said defects.

3. In a system for testing digital information recording surfaces for defects evidenced by loss of transitions originally recorded, the combination of means for reproducing transitions in the form of transition signals from prerecorded patterns on a recording surface, means for generating reconstructed transition signals representing the first said transition signals plus transition signals lost between the prerecording and the reproducing of said transitions, means for comparing reproduced transitions with reconstructed transitions and means for counting the excess of reconstructed transitions over reproduced transitions in order to measure said lost transitions.

References Cited in the file of this patent

UNITED STATES PATENTS

| | | |
|---|---|---|
| 2,470,839 | Zuschlag | May 24, 1949 |
| 2,793,344 | Reynolds | May 21, 1957 |
| 2,854,624 | Lubkin et al. | Sept. 30, 1958 |
| 2,870,430 | Hancock | Jan. 20, 1959 |